United States Patent

Aucoeur

[11] Patent Number: 6,064,891
[45] Date of Patent: May 16, 2000

[54] DEVICE FOR CONNECTING A TELEPHONE SWITCH TO A FIXED TELEPHONE NETWORK VIA A PLURALITY OF FIXED RADIOTELEPHONE TERMINALS OF A RADIOTELEPHONE NETWORK

[75] Inventor: Jean-Pierre Aucoeur, Cormeilles, France

[73] Assignee: Alcatel, Paris, France

[21] Appl. No.: 09/114,283

[22] Filed: Jul. 13, 1998

[30] Foreign Application Priority Data

Jul. 15, 1997 [FR] France ................................ 97 08946

[51] Int. Cl.[7] .................................................. H04B 7/185
[52] U.S. Cl. ..................... 455/555; 455/554; 455/426; 455/427; 455/12.1; 455/422; 455/560
[58] Field of Search .................... 455/422, 463, 455/554, 555, 560–562, 524–525, 426, 427–430, 12.1, 464, 461–462, 465; 379/225, 231–234, 198

[56] References Cited

U.S. PATENT DOCUMENTS 4,658,096  4/1987  West, Jr. et al. ..................... 455/422
4,748,655  5/1988  Thrower et al. ..................... 455/555
4,890,315  12/1989  Bendixen et al. .................... 455/554
5,564,072  10/1996  Aguilera et al. ..................... 455/422

FOREIGN PATENT DOCUMENTS

0583233A2  2/1994  European Pat. Off. .
WO95/29565  11/1995  WIPO .

*Primary Examiner*—Doris H. To
*Attorney, Agent, or Firm*—Sughrue, Mion, Zinn, Macpeak & Seas, PLLC

[57] ABSTRACT

A device connects a telephone switch to a fixed telephone network via a GSM or derived type radiotelephone network; a plurality of fixed user terminals being connected to said telephone switch. The device includes a plurality of fixed radiotelephone terminals and coordinator device for controlling dynamically the allocation of radiotelephone terminals to telephone connections set up between the fixed telephone network and the user terminals. The latter device activate at any time one only of the fixed radiotelephone terminals chosen from those available at the time concerned to cause it to listen out for terminal seek messages.

4 Claims, 2 Drawing Sheets

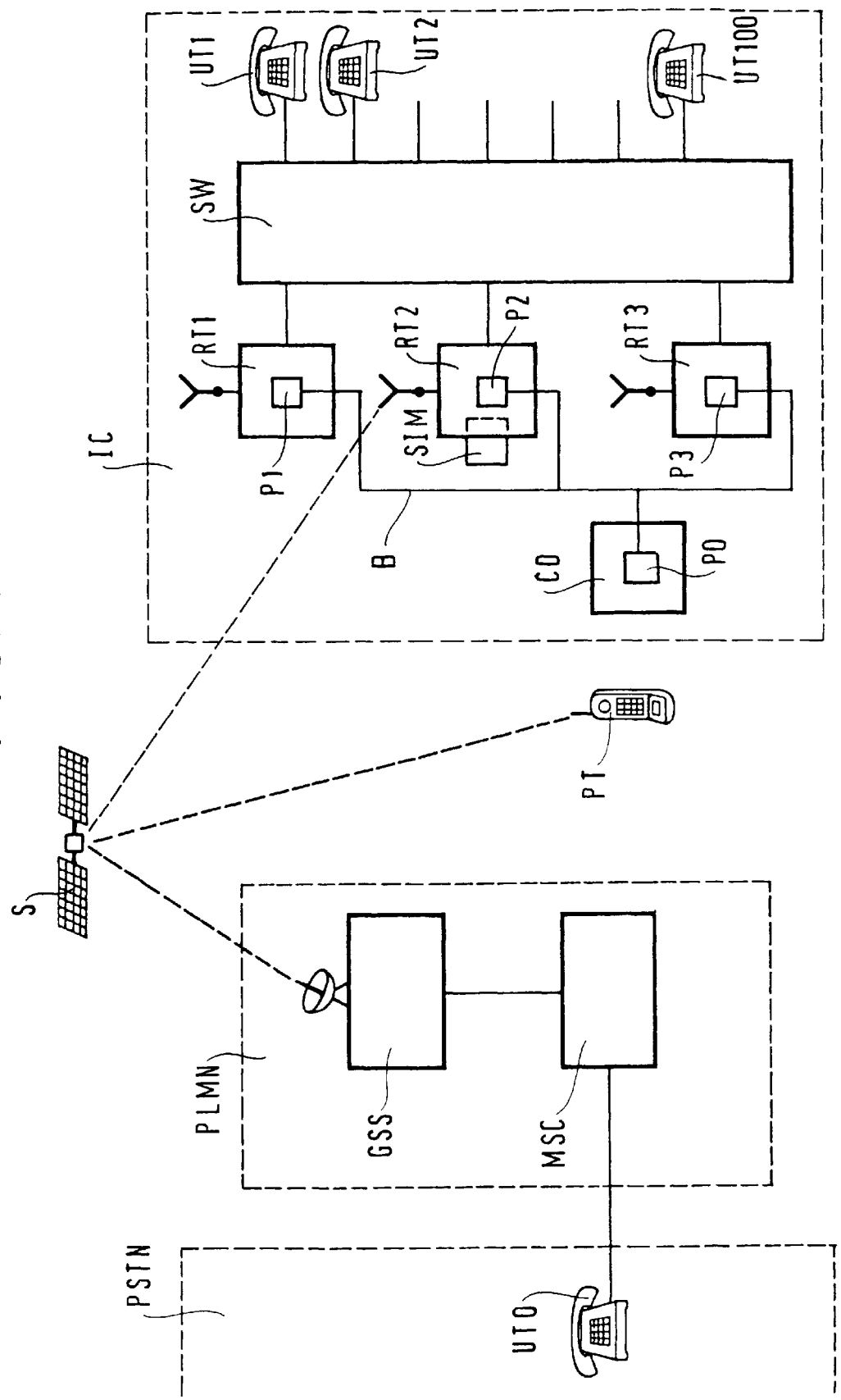

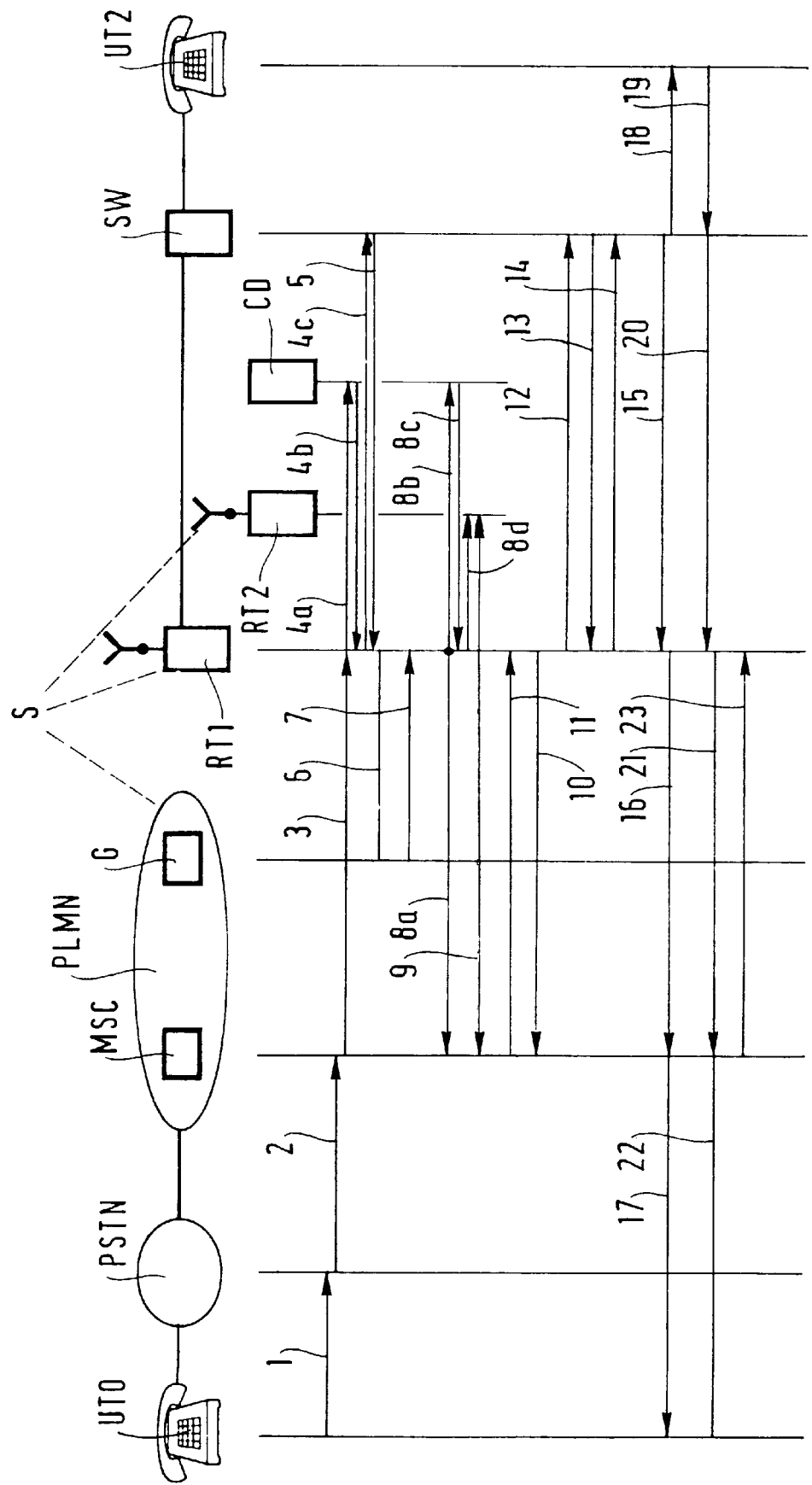

DEVICE FOR CONNECTING A TELEPHONE SWITCH TO A FIXED TELEPHONE NETWORK VIA A PLURALITY OF FIXED RADIOTELEPHONE TERMINALS OF A RADIOTELEPHONE NETWORK

FIELD OF THE INVENTION

The invention concerns a device for connecting a telephone switch to a fixed telephone network via a radiotelephone network, a plurality of fixed radiotelephone terminals replacing a cable connection. Each fixed radiotelephone terminal has functions analogous to those of a conventional portable radiotelephone terminal, but it connects a switch to the fixed telephone network rather than connecting a single user. The device in accordance with the invention can be used to connect to a public telephone network a switch serving an hotel or a village located in an isolated region where laying a cable or any other terrestrial infrastructure would be too costly. The switch serves a group of fixed user terminals by routing incoming calls from the public network. Each fixed radiotelephone terminal is used successively for different user terminals because the latter are not used permanently. A plurality of radiotelephone terminals can share the same frequency band by time-division or code-division.

The invention is more particularly concerned with GSM type radiotelephone networks and those of types derived from the GSM type including a geostationary satellite or tracking satellites. The GSM type network has the following characteristics:

A geographical area divided into cells to enable re-use of carrier frequencies.

A gateway manages the resources of each cell, in terms of the carrier frequencies and the plurality of channels carried by each carrier frequency.

At least one mobile radio service switching center manages calls, connections with the fixed telephone network and databases containing: the directory number, the mobile user international number and the location of each mobile user.

A GSM or derived type radiotelephone terminal can be in only one of the following states:
listening out for messages seeking a terminal, or
in telephone communication with the radiotelephone network, or
available, a terminal being considered to be available even if it is carrying out a location or authentication procedure.

BACKGROUND OF THE INVENTION

Standard GSM networks and networks derived from them are not designed for a plurality of users to use the same user terminal. Users personalize the terminals they use by inserting in the terminals a subscriber identification module (SIM) card containing an international mobile subscriber identity (IMSI) which determines the account to which calls will be billed. After an initialization phase, this terminal is designated in radio messages by a temporary mobile subscriber identity (TMSI) which protects the anonymity of the user. An authentication procedure uses a secret key stored in the SIM card to prevent fraudulent use of the IMSI or the TMSI of another user when a call is sent and when a call is received.

The use of a plurality of fixed radiotelephone terminals to connect the same switch to a GSM network raises the problem of coordinating the terminals because a plurality of available terminals must be prevented from responding at the same time to a seek message concerning the same user terminal.

Document GB 2 293 524 describes a process for solving these problems but does not describe means for coordinating and optimizing the use of a plurality of fixed radiotelephone terminals used under such conditions.

OBJECT AND SUMMARY OF THE INVENTION

The aim of the invention is to propose a device which solves this problem and enables the use, without modification, of a standard GSM type radiotelephone network or a network derived therefrom.

The invention consists in a device for connecting a telephone switch to a fixed telephone network via a plurality of fixed radiotelephone terminals of a radiotelephone network, a plurality of user terminals being connected to said telephone switch, said device including a plurality of fixed radiotelephone terminals each including means for communicating with said radiotelephone network, said means including a processor, each of the fixed radiotelephone terminals being in one only of the following states:
listening out for terminal seek messages, or
in telephone communication with the radiotelephone network, or
available, a terminal being considered to be available even if it is executing a location or authentication procedure,
wherein the device further includes coordinator means connected to each of the processors of the fixed radiotelephone terminals to control dynamically allocation of said terminals to telephone connections set up between the fixed telephone network and the user terminals,
wherein each fixed radiotelephone terminal includes means for indicating its status to the coordinator means, and
wherein the coordinator means include means for activating at any time one only of the fixed radiotelephone terminals chosen from those available at the time concerned to listen out for terminal seek messages.

The device so characterized does not require modification of the GSM network used because it monitors the status of each of the fixed radiotelephone terminals and activates one of them to listen out for seek messages without involving the GSM network.

In a preferred embodiment, the fixed radio terminals include means for transmitting an identity received in a seek message broadcast by the radiotelephone network to the coordinator means,
and the coordinator means contain and update a table of mobile subscriber international identities and mobile subscriber temporary identities corresponding to the user terminals connected to the switch to:
determine if a received identity corresponds to one of said user terminals and to respond to the radiotelephone terminal that received it, and
if necessary, command said terminal to set up a connection with the radiotelephone network.

The device so characterized provides simple management of IMSI and TMSI. Centralized processing means that the number of radiotelephone terminals can be increased or reduced without modifying the resources needed for such processing.

In a preferred embodiment a single radiotelephone terminal includes means for authenticating a radiotelephone terminal using the same key for all calls received or transmitted via said fixed radiotelephone terminal, whichever that may be,
and the other fixed radiotelephone terminals include means for requesting the coordinating means to indicate to them which fixed radiotelephone terminal includes authentication means and thereafter requesting the designated terminal to perform the authentication procedure.

The device so characterized provides simple management of user terminal authentication keys because a single key is common to all the fixed radiotelephone terminals. It suffices for the radiotelephone network to allocate the same key to all the user terminals connected to the switch concerned.

In a preferred embodiment each fixed radiotelephone terminal further includes means for performing a location procedure for all the international or temporary mobile subscriber identities contained in the table, and the coordinator means include means for choosing one of the available radiotelephone terminals and activating it to perform the location procedure for all the international mobile subscriber identities contained in the table.

The device so characterized busies only one radiotelephone terminal to perform the procedure for locating all the user terminals connected to the switch concerned, which reduces the time taken for tasks other than connections.

BRIEF DESCRIPTION OF THE DRAWINGS

The invention will be better understood and other features will become apparent from the description given hereinafter and the accompanying drawings:

FIG. 1 is the block schematic of an embodiment of the device in accordance with the invention in an example of an application thereof;

FIG. 2 is a timing diagram illustrating the operation of the device in accordance with the invention during call set-up in this application example.

MORE DETAILED DESCRIPTION

FIG. 1 is the block schematic of one example of an application of a device in accordance with the invention to provide the services of a public switched telephone network (PSTN) to a community IC in an isolated region. The isolated community IC is served by a switch SW to which one hundred standard telephone terminals UT1, ..., UT100 are connected, for example. The switch SW is connected to a public switched telephone network (PSTN) via a public land mobile network (PLMN) of a type derived from the GSM type.

The PLMN includes a geostationary satellite or a plurality of tracking satellites and principally serves portable radiotelephone terminals PT. A mobile radio service switching center MSC is connected to a satellite S via a gateway G that maintains a radio link with the satellite S. The switch SW communicates with the satellite S by means of three radiotelephone terminals RT1, RT2, RT3. Each fixed radiotelephone terminal RT1, RT2, RT3 is connected by a standard telephone cable to the switch SW and by a bus B to a coordinator device CD which includes a processor P0.

The fixed radiotelephone terminal RT2 is the only one to include an identification card reader device. A standard SIM card is inserted in this reader.

Each fixed radiotelephone terminal RT1, RT2, RT3 includes a respective processor P1, P2, P3 storing a program that determines the operation of the terminal. The operation is identical to that of a standard GSM or derived type radiotelephone terminal apart from the identification function, the authentication function and the direct inward dialling function, which are specific to the device of the invention. In particular, they can be commanded by the coordinator device CD via the bus B. A preferred implementation is to use a standard GSM or derived type radiotelephone terminal modifying only the processor program to perform the functions specific to the device of the invention.

Each of the radiotelephone terminals RT1, RT2, RT3 can be in only one of the following states:
listening out for terminal seek messages, or
in telephone communication with the PLMN, or
available, a terminal being considered to be available even if it is performing a location or authentication procedure.

A terminal which is available changes state when the coordinator device CD commands that terminal to listen out for seek messages or to set up a connection. The authentication procedures are performed by the terminal RT2 in parallel with its other tasks which are identical to those of the other terminals. In other words, the terminal RT2 is not considered to be busy if it is merely executing the authentication procedure.

In this example, the PLMN identifies all the user terminals UT1, ..., UT100 by one hundred international mobile subscriber identities (IMSI) which are the same apart from two digits. When the SIM card is inserted into the terminal RT2, its processor P2 reads the IMSI that it contains and transmits it to the coordinator device CD. When a terminal RT1, RT2 or RT3 which is listening out for seek messages receives a message of this kind, it transmits the IMSI or TMSI received in that message to the coordinator device CD. The coordinator device CD contains and updates a table establishing the correspondence between the one hundred international mobile subscriber identities (IMSI) and the one hundred temporary mobile subscriber identities (TMSI) corresponding to the user terminals UT1, ..., UT100 connected to the switch SW if such temporary identities have been assigned. The table is updated when the PLMN indicates to one of the terminals RT1, RT2 or RT3 that a first or a new TMSI is assigned to one of the user terminals UT1, ..., UT100.

The processor P0 of the coordinator device CD determines if a received IMSI or TMSI corresponds to one of the user terminals UT1, ..., UT100 and responds to the terminal that received it either by instructing it to resume listening out for seek messages if the received identity is not one of the identities contained in the table or by instructing it to set up a connection if the received identity is one of the identities contained in the table. In this example the coordinator device CD must identify a set of one hundred IMSI and a set of one hundred TMSI corresponding to the respective terminals UT1, ..., UT100.

To simplify the device only one SIM card is used and the one hundred IMSI are identical apart from two digits. To recognize an IMSI the software of the coordinator device CD masks two predetermined digits of the digits constituting the IMSI read on the SIM card, masks two predetermined digits of the digits constituting the IMSI contained in a received message and compares the results. If all the non-masked digits are recognized, this indicates that the terminal sought is one of the one hundred terminals UT1, ..., UT100.

The two masked digits are useful to the PLMN, however. They distinguish the one hundred fixed user terminals UT1, ..., UT100, in particular so that their calls can be billed independently.

In other embodiments, in which a plurality of fixed radio terminals each have an SIM card, all the SIM cards must contain the same IMSI and the same decoding key so that any fixed radio terminal can be used to set up connections to any terminal UT1, ..., UT100. The advantage of this plurality of SIM cards is that it introduces redundancy to improve fault tolerance.

If a received message contains a TMSI the processor P0 compares the latter with the TMSI in its memory.

When a radiotelephone terminal RT1, RT2 or RT3 sets up a connection for an incoming call from the PLMN or an outgoing call from a terminal UT1, ..., UT100, the radiotelephone terminal must be authenticated in order to prevent fraud. An authentication procedure is performed in accordance with a standardized GSM procedure using a secret key stored on the SIM card. The authentication procedure is always performed by the terminal RT2, regardless of which radiotelephone terminal RT1, RT2 or RT3 sets up the connection and regardless of which user terminal UT1, ..., UT100 is the beneficiary of the connection. In other words, the secret key stored on the SIM card is common to all the terminals UT1, ..., UT100.

Alternatively, each fixed radio terminal can have its own SIM card and perform the authentication procedure itself, using its own secret key.

The location procedure is a standardized GSM procedure which is repeated periodically as if the terminals UT1, ..., UT100 were mobile. The coordinator device CD periodically chooses one of the available radiotelephone terminals and commands it to execute the location procedure for the one hundred IMSI or TMSI in the table.

The direct inward dialling function is implemented in accordance with the following process that does not require modification of the PLMN, because it is part of the GSM standard: the MSC sends a SETUP message which contains the directory number of the called user terminal in accordance with the GSM standards. The terminal RT1, RT2 or RT3 which is in charge of a connection retransmits the directory number to the switch SW so that the latter can select the called user terminal. The software of each terminal RT1, RT2 or RT3 is modified to extract the directory number of the called user terminal UT1, ..., UT100 from the SETUP message received to set up each call and to send this number to the switch SW in the form of standard signalling messages to enable the switch to select the called user terminal.

FIG. 2 represents a timing diagram showing the operation of the device in accordance with the invention on setting up a connection between a user terminal UT0 connected to the PSTN and a user terminal UT2 of the isolated community IC:

1) A user lifts the handset of the terminal UT0 and keys the directory number of the terminal UT2.

2) A PSTN switching center sends a mobile radio service switching center MSC a message requesting the setting up of a connection with the terminal UT2 designated by the directory number.

3) The MSC consults the databases of the GSM network to discover the IMSI corresponding to the directory number and the geographical area in which the called terminal is located, in the same way as for a standard mobile terminal. It then knows that the called terminal is in one of the geographical areas served by the satellite S. It sends a message to seek the terminal designated by this IMSI or TMSI to this area via the gateway G and satellite S.

4a) If the fixed radiotelephone terminal RT1, for example, is responsible for listening out for seek messages at the time concerned it receives the above message. It sends the received identity to the coordinator device CD. If the message contains an IMSI, the device CD compares the IMSI received with the IMSI stored in its table, apart from two digits. If the message contains a TMSI the device CD compares the received TMSI with those in its memory. It is therefore capable of recognizing one of the one hundred IMSI or the one hundred TMSI corresponding to the terminals UT1, ..., UT100. In this instance, the comparison result is positive and it recognizes the IMSI or TMSI corresponding to the user terminal UT2.

4b) The device CD has received an identity and therefore switches the fixed radio terminal RT1 from the seek message listening state to the connection state and chooses another available terminal to switch into the seek message listening state.

4c) The terminal RT1 then sends a message to the switch SW to indicate an incoming call.

5) The switch SW responds with a message requesting transmission of the first digit of the directory number of the called terminal.

6) The terminal RT1 requests the gateway G via the satellite S to allocate a radio channel for a telephone connection.

7) The gateway G allocates a radio channel to the terminal RT1.

8a) The terminal RT1 then sends to the mobile radio service switching center MSC a positive response to the seek message.

8b) It also asks the coordinator device CD which terminal is responsible for executing the authentication procedure.

8c) The device CD tells it that this is the terminal RT2.

8d) The terminal RT1 then sends a message to the terminal RT2 requesting it to execute the authentication procedure. The terminal RT2 executes it.

9) The terminal RT2 and the switching center MSC exchange messages to authenticate the terminal RT2 using the standardized GSM procedure. During this authentication procedure the terminal RT2 uses the same secret key on the SIM card regardless of which of the terminals UT1, ..., UT100 is the called terminal. Encryption/decryption of the speech signals in accordance with the standardized GSM procedure is then initialized.

10) The MSC then requests the terminal RT1 to set up the connection. The MSC sends a SETUP message which contains the directory number of the called user terminal in accordance with the GSM standards. The terminal RT1 sends it to the switch SW to select the called user terminal.

11) The terminal RT1 confirms to the MSC that the connection is set up.

12) The terminal RT1 sends the first digit of the directory number to the switch SW.

13) The switch SW acknowledges receipt of this first digit and requests transmission of the second digit.

14) The terminal RT1 sends the second digit of the directory number to the switch SW.

15) This process is repeated until all of the digits have been transmitted to the switch SW. The latter then indicates to the terminal RT1 that it has received the complete number. It then selects the called user terminal UT2.

16) The terminal RT1 then sends an alert message to the MSC.

17) The MSC re-transmits the alert message to the PSTN.

18) At the same time the switch SW sends a ringing signal to the called terminal UT2.

19) When the handset of the terminal UT2 is lifted, the latter signals this to the switch SW.

20) The switch SW signals to the terminal RT1 that the call has been answered.

21) The terminal RT1 requests the MSC to connect the calling terminal UT0.

22) The MSC re-transmits this request to the PSTN.

23) Then it confirms execution of this request to the terminal RT1.

The scope of the invention is not limited to radiotelephone networks using satellites and derived from GSM type networks. The invention can be applied to standard type GSM networks.

I claim:

1. A device for connecting a telephone switch to a fixed telephone network via a plurality of fixed radiotelephone terminals of a radiotelephone network, a plurality of user terminals being connected to said telephone switch, said device including a plurality of fixed radiotelephone terminals each including means for communicating with said radiotelephone network, said means including a processor, each of the fixed radiotelephone terminals being in one only of the following states:

listening out for terminal seek messages, or in telephone communication with the radiotelephone network, or available, a terminal being considered to be available even if it is executing a location or authentication procedure, wherein the device further includes coordinator means connected to each of the processors of the fixed radiotelephone terminals to control dynamically allocation of said terminals to telephone connections set up between the fixed telephone network and the user terminals, wherein each fixed radiotelephone terminal includes means for indicating its status to the coordinator means, and wherein the coordinator means include means for activating at any time one only of the fixed radiotelephone terminals chosen from those available at the time concerned to listen out for terminal seek messages.

2. A device according to claim 1, wherein the fixed radio terminals include means for transmitting an identity received in a seek message broadcast by the radiotelephone network to the coordinator means, and wherein the coordinator means contain and update a table of mobile subscriber international identities and mobile subscriber temporary identities corresponding to the user terminals connected to the switch to:

determine if a received identity corresponds to one of said user terminals and to respond to the radiotelephone terminal that received it, and if necessary, command said terminal to set up a connection with the radiotelephone network.

3. A device according to claim 1, wherein a single radiotelephone terminal includes means for authenticating a radiotelephone terminal using the same key for all calls received or transmitted via said fixed radiotelephone terminal, whichever that may be, and wherein the other fixed radiotelephone terminals include means for requesting the coordinating means to indicate to them which fixed radiotelephone terminal includes authentication means and thereafter requesting the designated terminal to perform the authentication procedure.

4. A device according to claim 1, wherein each fixed radiotelephone terminal further includes means for performing a location procedure for all the international or temporary mobile subscriber identities contained in the table, and wherein the coordinator means include means for choosing one of the available radiotelephone terminals and activating it to perform the location procedure for all the international mobile subscriber identities contained in the table.

* * * * *